US006940974B2

(12) United States Patent
August et al.

(10) Patent No.: US 6,940,974 B2
(45) Date of Patent: Sep. 6, 2005

(54) SYSTEMS AND METHODS FOR GENERATING TONES FOR OPERATING TELEPHONES

(75) Inventors: Clifford J. August, Vancouver (CA); Thomas Heinrich Sternberg, Delta (CA); Mathieu Schneider, Burnaby (CA)

(73) Assignee: Chris August, Vancouver (CA)

( * ) Notice: Subject to any disclaimer, the term of this patent is extended or adjusted under 35 U.S.C. 154(b) by 304 days.

(21) Appl. No.: 10/236,251

(22) Filed: Sep. 4, 2002

(65) Prior Publication Data

US 2003/0108188 A1 Jun. 12, 2003

Related U.S. Application Data

(60) Provisional application No. 60/316,913, filed on Sep. 4, 2001.

(51) Int. Cl.[7] .................................................. H04M 3/00
(52) U.S. Cl. .................. 379/418; 379/357.03; 379/361
(58) Field of Search ....................... 379/355.01, 357.03, 379/361, 418

(56) References Cited

U.S. PATENT DOCUMENTS 4,103,115 A 7/1978 Milkes
4,980,910 A 12/1990 Oba et al.
5,583,919 A 12/1996 Talvard et al.
5,583,933 A * 12/1996 Mark .................... 379/357.04
5,859,896 A 1/1999 Rosen
5,901,217 A 5/1999 Kanbar
6,049,604 A 4/2000 Lin
6,118,867 A 9/2000 Ban
6,169,799 B1 1/2001 McIntosh
6,240,175 B1 5/2001 Barber

FOREIGN PATENT DOCUMENTS

CA 2231006 3/1997

* cited by examiner

*Primary Examiner*—Jefferey F. Harold
(74) *Attorney, Agent, or Firm*—Michael R. Schacht; Schacht Law Office, Inc.

(57) ABSTRACT

A system for generating number tones for dialing a telephone device comprising a microphone. The system comprises a housing, a first data entry device, first and second memory devices, an output signal generator, and a transducer. The housing defines a sound opening. The first data entry device is supported by the housing and is associated with a first sequence of stored digits. The first memory device stores the first sequence of stored digits. The second memory device stores frequency data associated with number tones. The output signal generator generates, upon activation of the first data entry device, an output signal based on the first sequence of stored digits and the frequency data. The transducer is mounted within the housing adjacent to the sound opening and converts the output signal into an audible signal. The housing is adapted to be attached to the telephone device with the sound opening adjacent to the microphone.

40 Claims, 6 Drawing Sheets

SYSTEMS AND METHODS FOR GENERATING TONES FOR OPERATING TELEPHONES

RELATED APPLICATIONS

This application claims priority of U.S. Provisional Patent Application Ser. No. 60/316,913, which was filed on Sep. 4, 2001.

TECHNICAL FIELD

The present invention relates to systems and methods for generating tones that may be processed by conventional telephone switching equipment and, more specifically, to external tone generators that may be attached to conventional telephones.

BACKGROUND OF THE INVENTION

Telephony equipment is commonly used to establish voice and data communications between served locations over a telephone network. Typically, the voice and data are transmitted between served locations through one or more central offices. Telephony equipment located at a central office will be referred to herein as switching equipment. Telephony equipment located at a served location will be referred to herein as a telephone device. A telephone device can be any device capable of communicating over the telephony network; telephone devices include analog telephones, PBX systems, digital telephone systems, computers, facsimile machines, and the like.

The present invention relates primarily to telephone devices used to establish voice communications over a telephone network, and that application will be described in detail below. A voice telephone typically includes a keypad and electronics for generating tones based on entries made on the keypad. When a connection is to be established between a source telephone and a destination telephone, the number of the destination telephone is entered using the keypad. The source telephone transmits the number of the destination telephone to the switching equipment at the central office as a sequence of tones. The switching equipment converts the sequence of tones into the destination telephone number and establishes an appropriate connection between the source and destination telephones.

To be recognized by the switch equipment, telephone devices typically generate tones referred to as DTMF signals. DTMF signals comprise first and second sine wave signals that are added together. A predetermined DTMF matrix relates the frequencies of the first and second sine wave signals with the numerical value associated with each DTMF signal. The switching equipment filters the DTMF tones to obtain the individual sine wave signals, determines the frequencies of thereof, and looks up the value associated with each DTMF tone in the DTMF matrix.

Conventionally, the frequency of the low frequency signal is one of a first group of four predetermined frequencies, while the frequency of the high frequency signal is one of a second group of four predetermined frequencies. The DTMF signal thus yields sixteen possible combinations of frequency signals. Conventionally, the DTMF signals represent the numerals 0–9, the symbols "*" and "#". The letters A–D are also represented, but conventional telephone keypads do not have keys corresponding to the letters A–D.

Telephone devices such as computers, facsimile machines, and telephones having speed dial can typically be pre-programmed to automatically generate a sequence of DTMF signals without entering in each digit on the keypad. More specifically, speed dial allows the user to associate a longer telephone number with a dedicated button or shorter combination of numbers. Speed dial capable telephone devices often allow the entry of extensions to a particular telephone number with pauses and other commands necessary to establish the desired connection.

However, many existing telephones do not have speed dial. In addition, even if speed dial is available on a given telephone device, many users do not know how or bother to learn how to use the speed dial features. Speed dial features are thus only available to a limited number of customers who use telephone devices.

Within the United States and Canada, telephony switching equipment is programmed to recognize a ten-digit telephone number. The first three digits of the telephone number are referred to as the area code; the last seven digits are referred to as the local portion. Traditionally, area codes have been associated with a geographic local calling area, and served locations within a given local calling area could connect to each other by transmitting either the local number or the digit "1" plus the local number.

Connections between served locations in different local calling areas require the entry of the entire ten-digit telephone number. Traditionally, calls between served locations in different local service areas involved a long distance carrier and associated long distance charges.

Factors such as the proliferation of cellular telephones, facsimile machines, and other telephone devices have depleted the number of local numbers within many area codes. In each situation where the local numbers within an area code have become depleted, the telephone companies have responded in one of two ways.

First, the traditional geographic calling areas have been broken into smaller regions, each of which has been assigned a new area code. This approach requires the purchase of new or updated switching equipment and is relatively expensive for the telephone companies.

The second approach is to create a new area code for the local service area with a shortage of local numbers. This approach is relatively inexpensive for the telephone company. In addition, calls between served locations having different area codes within a local calling area do not involve a long distance carrier; even though the entire ten-digit number is dialed, users are not required to pay long distance charges.

However, overlaying a new area code in an existing local service area requires users to enter the entire ten-digit telephone number even when dialing within the local calling area. As the number of local numbers with the new area code increases, customers will be forced to learn and remember which of two or more area codes are associated with each local number. In addition, customers will be required to enter the extra three digits associated with the area code each time they enter a local phone number.

While telephone devices having speed dial capabilities can lessen the burden of learning, remembering, and using ten-digit numbers for local dialing, these features are not available to many users as described above. Speed dial is thus only a partial answer to the problems associated with using one or more additional area codes in an existing local calling area.

Accordingly, in many cases adding area codes in an existing local calling area increases the burden on the customer and causes increased customer confusion. Telephone customers and regulatory agencies thus tend to resist or prohibit attempts by telephone companies to overlay new area codes in existing local calling areas.

Generally, the need exists for improved systems and methods of providing speed dialing capabilities to more telephone users. More specifically, the need exists for systems and methods that ease the transition to the use of ten digit telephone numbers within local calling areas.

SUMMARY OF THE INVENTION

The present invention is a system or method for generating number tones for dialing a telephone device comprising a microphone. The system comprises a housing, a first data entry device, first and second memory devices, an output signal generator, and a transducer. The housing defines a sound opening. The first data entry device is supported by the housing and is associated with a first sequence of stored digits. The first memory device stores the first sequence of stored digits. The second memory device stores frequency data associated with number tones. The output signal generator generates, upon activation of the first data entry device, an output signal based on the first sequence of stored digits and the frequency data. The transducer is mounted within the housing adjacent to the sound opening and converts the output signal into an audible signal. The housing is adapted to be attached to the telephone device with the sound opening adjacent to the microphone.

DETAILED DESCRIPTION OF THE INVENTION

Figure 1:
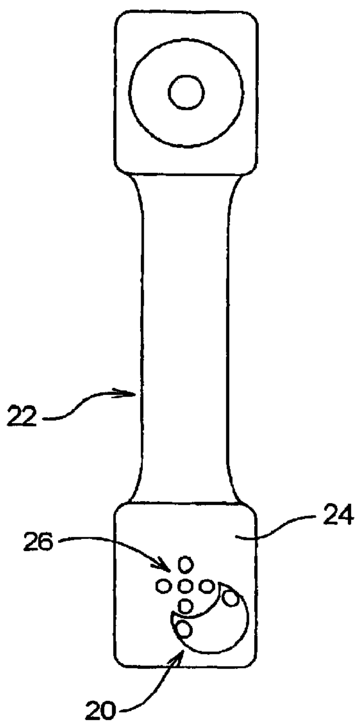
FIG. 1 is a top plan view of a first embodiment of tone generator system of the present invention mounted onto an exemplary telephone handset.

Referring initially to FIG. 1, depicted at 20 therein is a tone generator system constructed in accordance with, and embodying, the principles of the present invention. Also shown in FIG. 1 is a telephone hand set 22 having a mouthpiece 24. Inside the mouthpiece 24 is a microphone 26 schematically depicted in FIG. 1 by five holes in the mouthpiece 24.

The tone generator system 20 is affixed to the mouthpiece 24 of the telephone hand set 22 adjacent to the microphone 26 as shown in FIG. 1. The tone generator system 20 creates tones that are recognizable by a telephone network to which the telephone handset 22 is connected. In particular, conventional telephone networks recognize DTMF signals, and the tone generator system 20 generates audible DTMF signals representing one or more numbers. The location of the tone generator systems 20 next to the microphone 26 allows the microphone to detect the audible DTMF signals and convert these signals into electrical signals that may be processed in a conventional manner by the telephone network.

Figure 2:
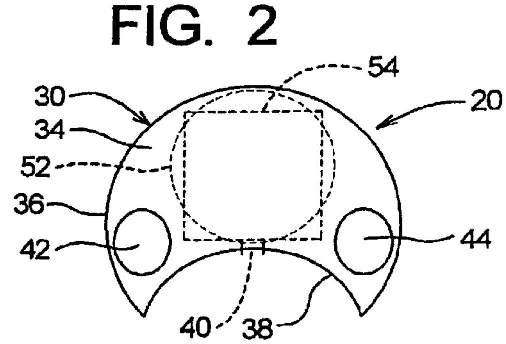
FIG. 2 is a top plan view of the tone generator system of FIG. 1, with phantom lines showing the location of certain elements thereof.
Figure 3:
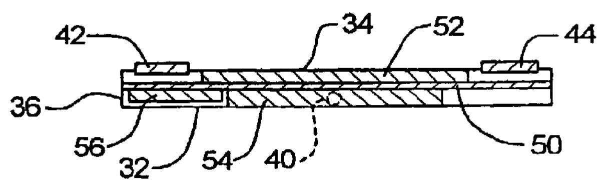
FIG. 3 is a section view of the tone generator system of FIG. 1.
Figure 4:
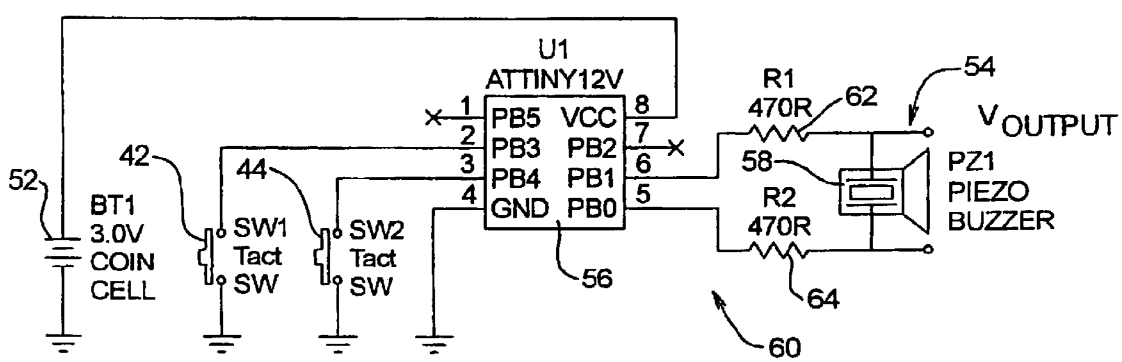
FIG. 4 is a circuit diagram depicting the electrical circuit of the tone generator system of the present invention.

Referring now to FIGS. 2–4, the tone generator system 20 will now be described in further detailed. As shown in FIGS. 2 and 3, the tone generator system 20 comprises a housing 30 having an inner wall 32, an outer wall 34, and first and second edge walls 36 and 38. The inner wall 32 is adapted to be secured to the telephone handset 22. The inner wall 32 to the telephone handset 22 may be any convenient permanent or temporary adhesive such as glue, double-stick tape, hook and loop fastener, and the like. Preferably, the fastening system is formed by double stick tape (not shown) secured to the outer surface of the inner wall 32 at the factory and protected by a release sheet before installation on the handset 22.

A sound opening 40 is formed in the second edge wall 38. In the exemplary tone generator system 20, first and second button assemblies 42 and 44 are mounted to the housing 30 such that the buttons are accessible at the outer wall 34.

FIG. 3 shows that the tone generator system 20 further comprises a printed circuit board 50, a battery 52, a transducer assembly 54, and a processor 56. FIG. 4 additionally shows that the transducer assembly 54 comprises a piezoelectric element 58.

The battery 52, transducer assembly 54, processor 56, and first and second button assemblies 42 and 44 are all mounted to the printed circuit board 50. In addition, shown in FIG. 4 is a circuit 60 illustrating that the printed circuit board 50 contains wiring and additional circuit elements that electrically connect the buttons 42 and 44, battery 52, speaker assembly 54, and processor 56.

The buttons 42 and 44 are momentary switches that form first and second input devices for the system 20. In particular, these buttons 42 and 44 exist in a normally open state and, when depressed, are placed into a closed state. With the circuit 60 configured as described above, the processor 56 can detect whether the buttons 42 and/or 44 are in the open or closed states.

The processor 56 is a general-purpose processor capable of storing and running software comprising instructions and data. The exemplary processor 56 is an ATTINY12V processor, but other micro-processors of similar size and processing capacity can be substituted for the exemplary processor 56. In addition, the functions of the ATTINY12V processor and the software running thereon may be reproduced using discrete circuit components.

The exemplary ATTINY12V processor 56 comprises eight pins. The battery 52 is connected across pins 4 (ground) and 8 (power) to provide power to the processor 56. In addition, the processor 56 comprises first, second, and third input pins 1, 2 and 3 and first, second and third output pins 5, 6, and 7. In the system 20, the first and second buttons 42 and 44 are connected to the input pins 2 and 3, respectively. The output pins 5 and 6 are connected to first and second resistors 62 and 64. The piezo-electric element 58 is connected between the resistors 62 and 64. The input pin 1 and output pin 7 are unused in the exemplary circuit 60.

The output pins 5 and 6 of the processor 56 are connected to the piezo-electric element 58 through the resistors 62 and 64, respectively. The exemplary processor 56 is a digital device, and the digital output signal generated by the pins 5 and 6 may only be either HIGH or LOW; however, this digital output signal results in an analog output signal $V_{output}$ across the piezo-electric element 58 as will be described in further detail below.

The software running on the processor comprises at least one and possibly two separate routines. The first routine is referred to as an operational routine. The second routine, if used, is referred to as a programming routine. When the processor 56 is running the operational routine, the system 20 is in an operational mode in which activating one of the buttons 42 or 44 causes the system to generate one or more DTMF tones corresponding to one or more digit sequences. When the processor 56 is running the programming routine, the systems 20 is in a programming mode in which the stored digit sequences may be changed.

In the system 20 described herein, the digit sequences are three numbers long and represent an area code. In addition, the system 20 is designed to accommodate two digit sequences, with one digit sequence being associated with each of the two buttons. The use of two buttons is preferable in certain situations, such as when a new area code is being assigned to an existing local calling area.

When the system 20 is in the operation mode, activating one of the buttons 42 or 44 causes the output signal $V_{output}$ generated by the processor 56 to represent the DTMF signals associated with a selected digit sequence associated with the activated button. The transducer assembly 54 converts the output signal $V_{output}$ into audible DTMF tones corresponding to the selected digit sequence.

Figure 5:
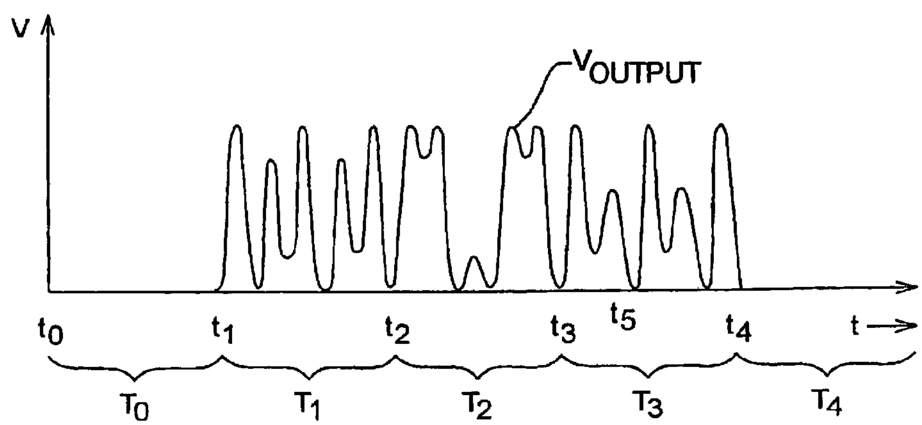
FIG. 5 is a plot depicting an analog output signal produced by the system of the present invention.

More specifically, FIG. 5 contains a graph of the output signal $V_{output}$ for an exemplary three-digit digit sequence. The graph of FIG. 5 plots voltage against time; the waveform represented in FIG. 5 is highly schematic and does not literally represent the actual output signal $V_{output}$. In a time period $T_0$ between times $t_0$ and $t_1$, no button has been pushed, and the output signal $V_{output}$ is zero. At time $t_1$, one of the buttons is activated to select a preset three-digit digit sequence. In a time period $T_1$ between times $t_1$ and $t_2$, the processor 56 generates the output signal $V_{output}$ such that the output signal $V_{output}$ is a DTMF signal representing a first digit of the selected digit sequence. In a time period $T_2$ between times $t_2$ and $t_3$, the processor 56 generates the output signal $V_{output}$ such that the output signal $V_{output}$ is a DTMF signal representing a second digit of the selected digit sequence. In a time period T3 between times $t_3$ and $t_4$, the processor 56 generates the output signal $V_{output}$ such that the output signal $V_{output}$ is a DTMF signal representing a third digit of the selected digit sequence. In a time period $T_4$ after times $t_4$, the generation of the DTMF tones representing the selected digit sequence is complete, and the output signal $V_{output}$ returns to zero.

The durations of the time periods $T_1$, $T_2$, and $T_3$ are sufficient for the telephone switching equipment to recognize the DTMF signal. The durations of the exemplary time periods $T_1$, $T_2$, and $T_3$ are approximately 0.25 to 0.50 seconds in the system 20, but time periods of different durations may be used.

The processor 56 may be selected and configured to generate an analog signal as shown in FIG. 5. However, the ATTINY processor 56 of the tone generating system 20 of the preferred embodiment does not have the capacity to generate an analog signal directly. The exemplary system 20 thus uses a digital pulse-width modulation technique such that a waveform of the output signal $V_{output}$ causes the transducer assembly 54 to create an audible DTMF signal that is recognizable by the telephone network.

The use of the processor 56 and transducer assembly 58 to generate DTMF tones will now be described in further detail. Table A set forth below contains an industry-standard DTMF tone matrix that represents the relationship between frequencies and digits:

TABLE A

| LOW/HIGH | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 9 | # | D |

More specifically, a DTMF signal is a composite signal comprising one of the LOW frequencies and one of the HIGH frequencies. For example, a DTMF signal associated with the digit "2" comprises a first or LOW sine wave having a frequency of 697 Hz and a second or HIGH sine wave having a frequency of 1336 Hz.

To represent analog DTMF signals with digital circuitry, the processor 56 stores sets of frequency data in the form of series of numbers that each represents one of seven of the eight frequencies contained in Table A; the eighth frequency, 1633 Hz, is only used to represent letters and is thus omitted.

In particular, the third through ninth columns in the Table B attached hereto as Exhibit A each contain the series of numbers that represent one of the seven frequencies used to form DTMF signals. The first column contains a sequential sample number from 1 to 78, and the second column contains a number representing time in increments of 55 microseconds.

The numbers in Table B generally correspond to the amplitude of a sine wave having the frequency identified at the top of Table B at a number of points in the cycle of the waveform. A plot or other reproduction of these numbers at the time intervals in the second column will yield a representation of a sine wave of the desired frequency.

All of the number series are repeated for the signal duration of a given DTMF signal; this signal duration corresponds to the durations of the periods $T_1$, $T_2$, and $T_3$ described above. Several of the number sequences are stored several times in Table B to improve reproduction of a composite signal, which is calculated as will be described below. The number of samples reproduced in Table B is set at 78 to show all of the repeated number sequences.

To obtain a composite signal, the numbers in two of the columns of Table B are added to obtain composite data. For example, to create composite data associated with the digit "2", the numbers associated with the frequencies 697 Hz and 1336 Hz are added together for each sample period. For the digit "2", the composite number associated with the first sample is 1+1, or 2. The composite number associated with the tenth sample period is 35+11, or 46. These calculations are repeatedly performed throughout the signal duration, and the repeated series reduce distortions in the resulting composite signal.

The numbers representing the composite data calculated as just described generally correspond to the amplitude of a composite signal comprised of the frequencies 697 Hz and 1336 Hz at a number of points in the cycle of the waveform of the composite signal. A plot or other reproduction of these numbers at the time intervals in the second column will thus yield a representation of a composite signal.

Again, if the processor 56 contains a digital to analog converter, the composite signal could be generated directly from the composite data calculated as described above. For processors like the exemplary processor 56 that do not have the capacity to generate an analog signal, the composite data may be used as a pulse-width modulated signal that represents the analog composite signal.

The present invention implements a digital pulse-width modulation technique as follows. The composite data is stored within the processor 56 in the form of an eight-bit bye, with only least significant six bits being used to represent the composite signal. The use of six significant bits yields 64 possibilities, and the highest numbers in Table B do not add up to a composite number that is greater than 64.

The six significant bits of the composite numbers calculated as described above are used to determine the state of the output signal $V_{output}$ across pins 5 and 6 of the processor 56. In particular, the first bit determines the output voltage $V_{output}$ at cycle 0 of a 64 cycle period. The second bit determines the output voltage $V_{output}$ at cycles 1 and 2 of the 64 cycle period. The third bit determines the output voltage $V_{output}$ at cycles 3–7 of the 64 cycle period. The fourth bit determines $V_{output}$ at cycles 8–15 of the 64 cycle period. The fifth bit determines the output voltage $V_{output}$ at cycles 16–31 of the 64 cycle period. The sixth bit determines the output voltage $V_{output}$ at cycles 32–63 of the 64 cycle period.

Figure 6:
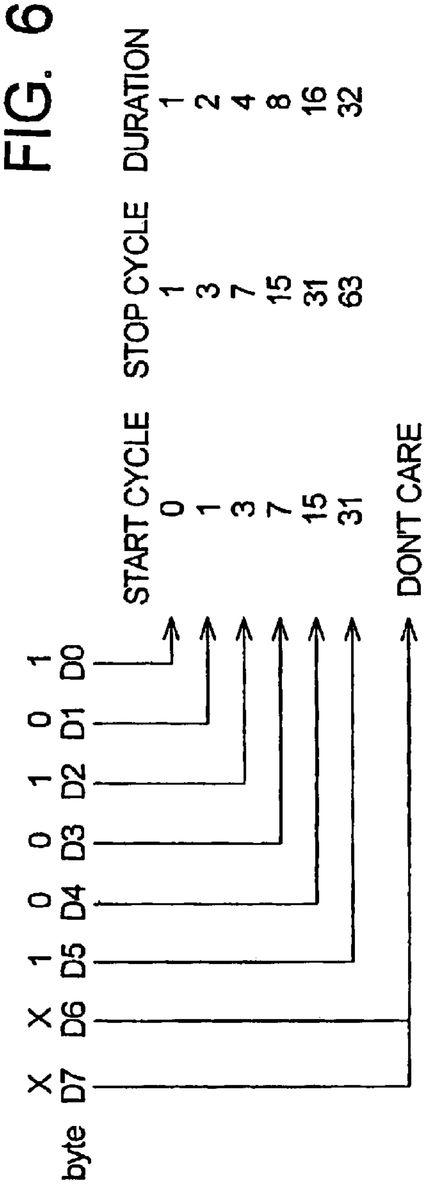
FIG. 6 depicts the relationship of an example of an eight-bit byte and a cycle used to create a pulse-width modulated signal.
Figure 7:
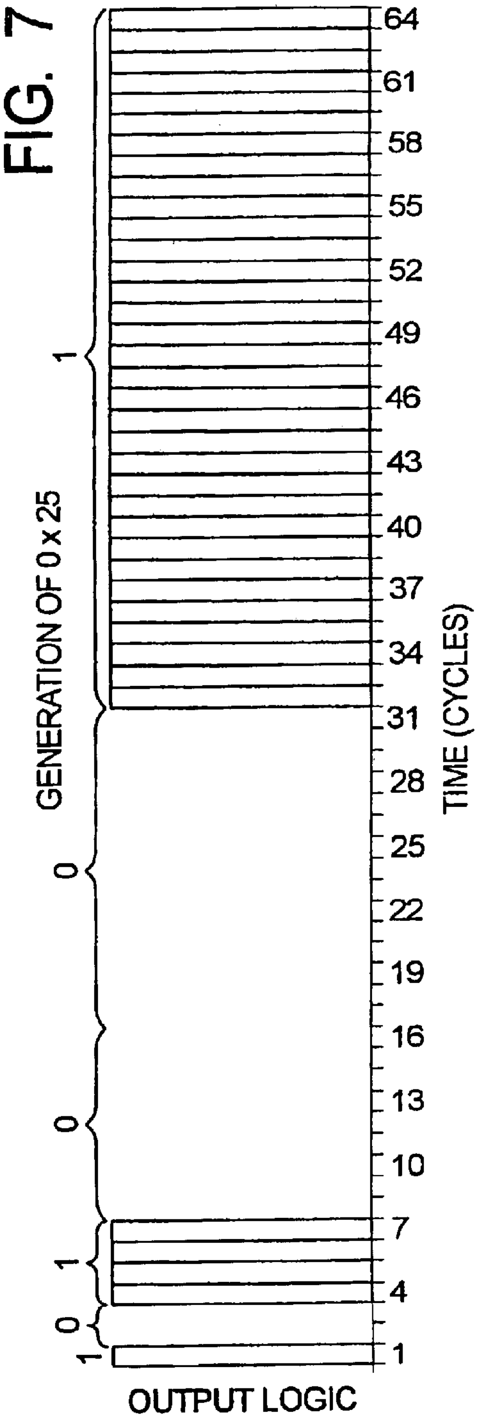
FIG. 7 depicts the pulse-width modulated signal created by the byte depicted in FIG. 6.

An example of this process is depicted in FIGS. 6 and 7. These figures illustrate the generation of the output logic signal given the example of a composite number equaling the hexadecimal number 0x25 (decimal: 37; binary: XX100101). The resulting digital output signal is shown in FIG. 7. The total length of the 64 cycle period is much less than the signal durations $T_1$, $T_2$, and $T_3$ described above.

As generally discussed above, the digital output signal is converted into the output voltage $V_{output}$ across the piezo-electric element 58. In particular, the piezo-electric element 58 is capacitive, and this capacitance, in series with the resistors 62 and 64, acts as a low pass filter that converts the digital output signal into the analog output voltage $V_{output}$.

Accordingly, referring for a moment back to FIG. 5, depicted therein at a sample time $t_s$ is the amplitude of the output voltage $V_{output}$. The time coordinates of FIGS. 5 and 7 are scaled such that the entire 64 cycle period of FIG. 7 occurs at the point $t_s$ in FIG. 5.

More traditional pulse-width modulation techniques could be used to obtain a digital output signal that would be filtered to obtain a suitable analog output voltage $V_{output}$. The system 20 uses the techniques describe herein to minimize instruction cycles on the processor 56 used by the exemplary system 20.

Figure 8:
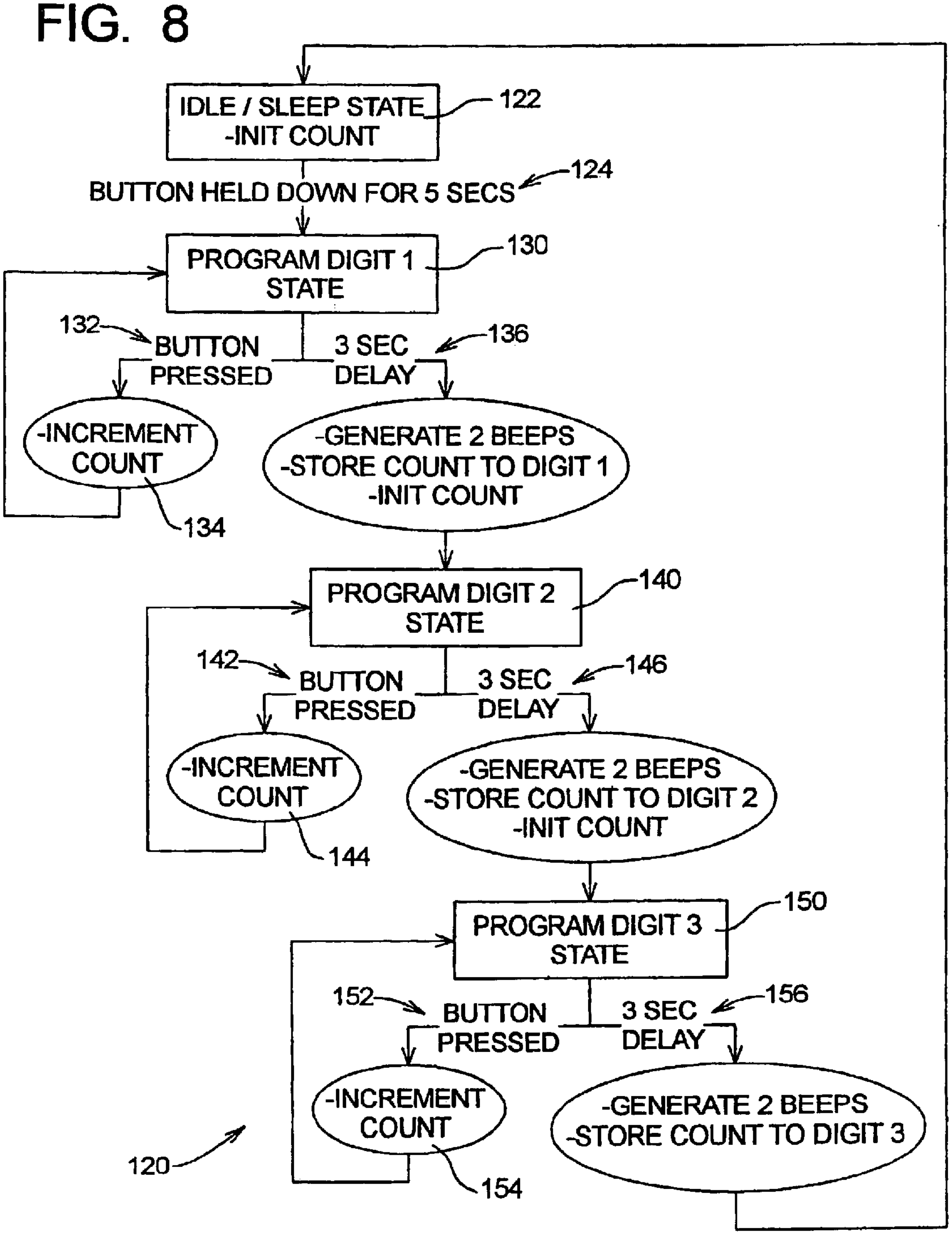
FIG. 8 depicts an example of a first optional programming mode that allows a system using one button to be programmed with a new digit sequence.
Figure 9:
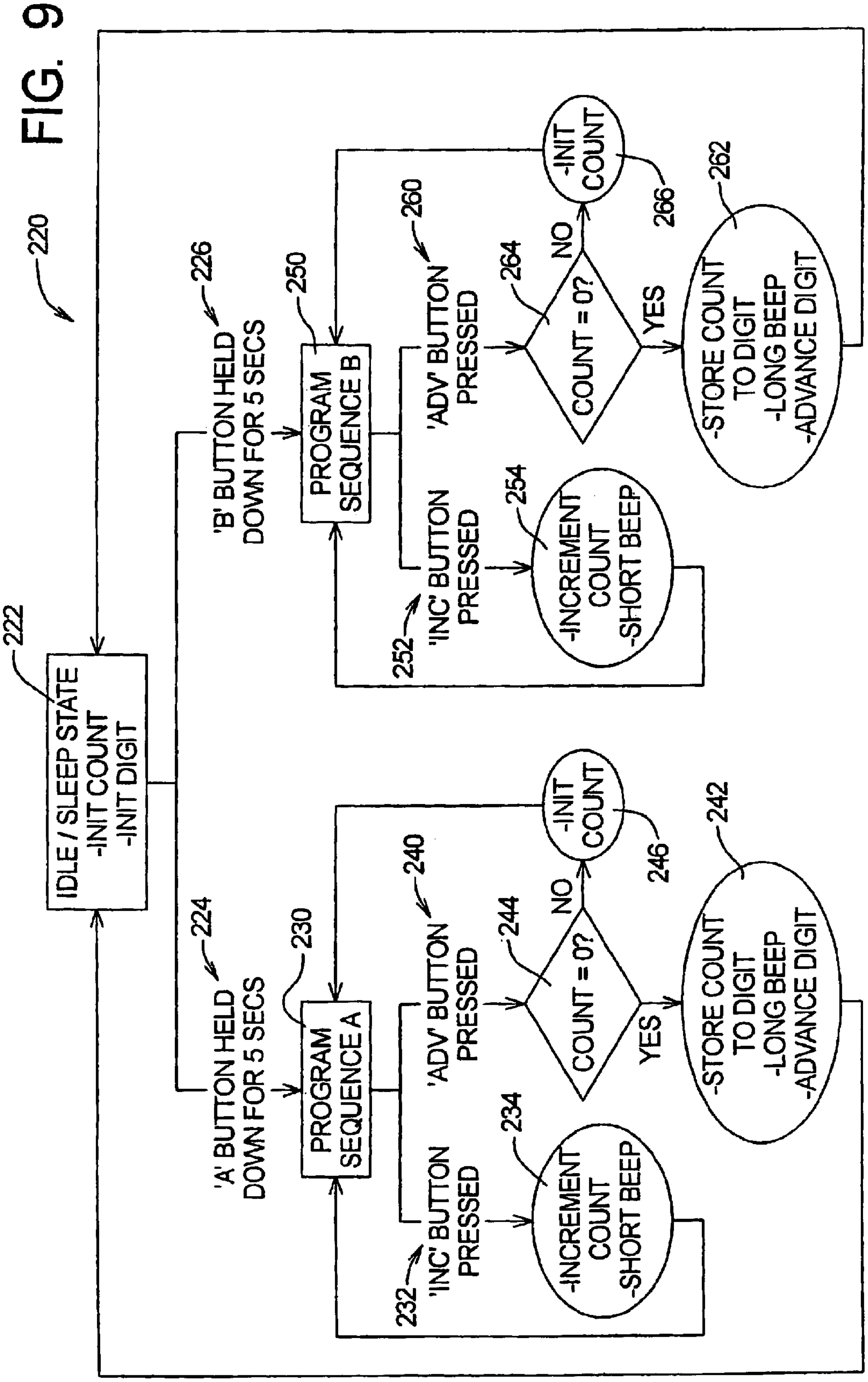
FIG. 9 depicts an example of a second optional programming mode that allows a system using two buttons to be programmed with a new digit sequence.

Referring now to FIGS. 8 and 9, two different examples of programming modes will now be described. As generally described above, the system 20 described above may be implemented with only the button 42 and not the button 44. FIG. 8 illustrates a programming mode 120 that may be implemented by a tone generation system of the present invention having only one button.

An idle/sleep state 122 is depicted at 122 in which the system 20 is waiting for an input on the button 42. If the button 42 is depressed momentarily (less than 5 seconds) as generally described above, the system 20 generates a sequence of DTMF tones based on the digit sequence associated with the button 42 as described above. If, however, a timer function 124 of the system 20 determines that the button 42 is depressed and held for more than five seconds, the system 20 enters the programming state.

A first digit entry step of the programming state is shown at 130. A first digit of a three-digit digit sequence is entered in this first data entry step. The first digit is entered by pressing the button 42 at step 132 and incrementing a counter at step 134. This is repeated until the button 42 has been pressed a number of times corresponding to the value of the first digit. When the number is entered, the user waits for more than three seconds. A timer 136 detects this delay; the system 20 then generates 2 beeps, stores the number in the counter as the first digit, and moves to a second data entry step 140.

The second data entry step detects button presses at 142 and increments a counter 144 to set a second digit of the digit sequence. After a three-second delay 146, the system 20 generates two beeps and moves the third data entry step 150. The third data entry step detects button presses at 152 and increments a counter 154 to set a third digit of the digit sequence. After a three-second delay 156, the system 20 generates two beeps and returns to the idle sleep state 122.

Referring now to FIG. 9, depicted therein is an alternate programming mode 220 for a system containing both of the buttons 42 and 44. As described above, each of these buttons 42 and 44 has an associated digit sequence, and the programming mode 220 allows the digit sequence associated with each of the buttons 42 to be changed.

In particular, an idle/sleep state is shown at 222 in FIG. 9. Again, momentarily pressing one of the two buttons 42 and 44 causes the system to generate a DTMF tone sequence based on the digit sequence corresponding to the depressed button 42 or 44. Pressing either of the buttons 42 or 44 and holding the button for 5 seconds as shown at steps 224 and 226 causes the system to enter the programming mode for the pressed button 42 or 44.

Referring initially to the "A" button, or button 42, a program sequence for the button 42 starts at step 230. Pressing the first button 42 at 232 increments a counter 234; this process is repeated until the button 42 has been pressed the number of times corresponding to a first digit of the digit sequence for the button 42. When the first digit has been entered, the second button 44 is pressed at step 240 to cause the system 20 to store the value of the counter 234 and beep at step 242. Optional steps 244 and 246 check for no button pushes (counter≠0) and initializes the counter if the button was not pushed.

The process for entering a digit sequence for the "B" button, or button 44, is shown at step 250. Pressing the first button 42 at 252 increments a counter 254. When the button 42 has been pressed the number of times corresponding to a first digit of the digit sequence for the button 44, the second button 42 is pressed at step 260 to cause the system 20 to store the value of the counter 254 and beep at step 262. Optional steps 264 and 266 check for no button pushes (counter≠0) and initializes the counter if the button was not pushed.

The programming modes 120 and 220 are optional. The system 20 may be fabricated with a predetermined digit sequence for the first button 42 and, if used, the second button 44. In this case, the system 2 may not have a programming mode, and the user will not be able to change the digit sequences associated with the buttons 42 and/or 44.

In addition, the programming modes can easily be altered to accommodate digit sequences of less than or more than three digits. Instead of using delays as at steps 124, 224, and 226 to enter the programming modes 120 and 220, other signals such as quickly depressing the buttons 42 and 44 twice in succession may be used.

Figure 10:
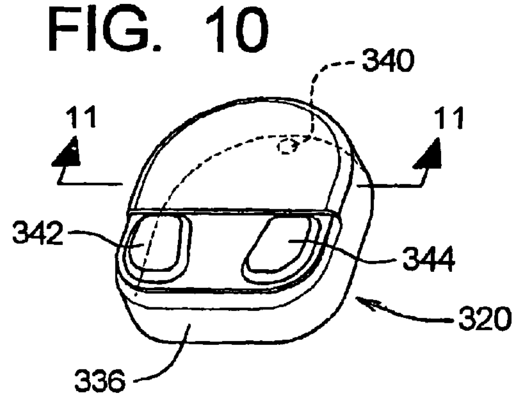
FIG. 10 is a perspective view of another embodiment of a tone generator system of the present invention.
Figure 11:
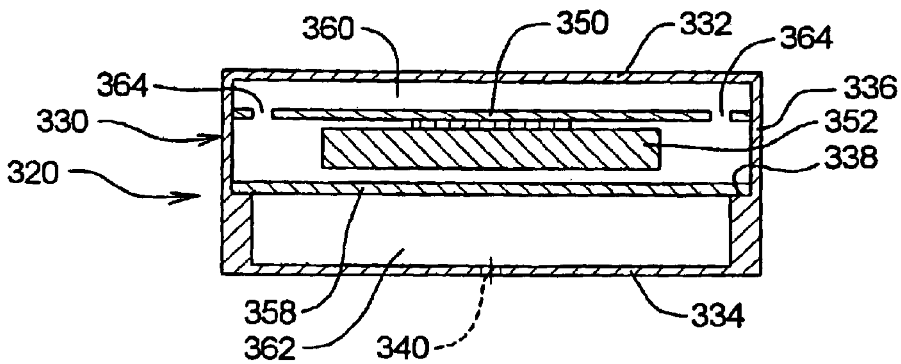
FIG. 11 is a section view taken along lines 11—11 in FIG. 10.

Referring now to FIGS. 10 and 11, yet another exemplary embodiment of a tone generator system constructed in accordance with the present invention is shown at 320 therein. The tone generator system 320 comprises a housing 330 comprising an outer wall 332, an inner wall 334, and a perimeter wall 336. A ledge 338 is formed along at least a portion of the perimeter wall 336 within the housing 330. A sound hole 340 is formed in the housing 330, and first and second buttons 342 and 344 are accessible on the outer wall 332.

FIG. 10 shows that the housing contains a printed circuit board 350 that is supported within the housing 330. A battery is mounted on the printed circuit board 352. In the system 320, a pre-fabricated speaker assembly is not used. Instead, a piezo-electric element 358 is mounted directly on the ledge 338 within the housing 330. The piezo-electric element 358 divides the interior of the housing 330 into upper and lower chambers 360 and 362. The printed circuit board 352 is arranged within the upper chamber 360, and holes 364 are formed in the printed circuit board 364.

The form factor of the system 20 is so small that, without the holes 364, the back pressure created by movement of the piezo-electric element 358 is too large and thus inhibits movement of the element 358. The housing 330, and in particular the size of the upper chamber 360, must be tuned for a particular piezo-electric element 358 to ensure that the element 358 can move vibrate as necessary to create the DTMF audible tones.

As generally described above, one of ordinary skill in the art will recognize that the system 20 can easily be modified to store one, three, or more digit sequences and/or digit sequences containing fewer or more than three digits. For example, the system 20 may be designed to dial the telephone number of a restaurant, in which case only one digit sequence is stored, and the digit sequence may contain seven or ten digits as necessary to complete the connection to the restaurant. In this case, the system 20 may be given out as a promotional item, and the programming mode may be omitted to prevent the user from changing the number.

We claim:

1. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for storing frequency data associated with number tones;

an output signal generator for generating, upon activation of the first data entry device, an output signal based on the first sequence of stored digits and the frequency data;

a transducer mounted within the housing adjacent to the sound opening for converting the output signal into an audible signal; and a printed circuit board mounted within the housing adjacent to the transducer for supporting the output signal generator, where at least one opening is formed in the printed circuit board; whereby the housing is adapted to be attached to the telephone device with the sound opening adjacent to the microphone; and the at least one opening in the printed circuit board is sized and dimensioned to reduce back pressure on the transducer.

2. A system as recited in claim 1, further comprising:

means for detecting activation of the first data entry device that places the system in a programming mode; and programming means for allowing the first sequence of stored digits to be changed when the system is in the programming mode.

3. A system as recited in claim 2, in which the programming means comprises a counter for counting activations of the first data entry device in a first group of activations, where the number of activations in the first group of activations is stored in the first memory device as a first portion of the first sequence of stored digits.

4. A system as recited in claim 2, in which the first sequence of stored digits comprises a plurality of numbers, the system further comprising a counter for counting activations of the first data entry device in a plurality of groups of activations, where the number of activations in each of the plurality of groups of activations are stored in the first memory device as one of the numbers of the first sequence of stored digits.

5. A system as recited in claim 4, further comprising:

a timer for measuring a delay period during which the first data entry device is not activated; and means for storing the number of activations in each of the plurality of groups of activations in the first memory device as one of the numbers of the first sequence of stored digits based on the delay period.

6. A system as recited in claim 1, further comprising a second data entry device supported by the housing, wherein:

the second data entry device is associated with a second sequence of stored digits;

the second sequence of stored digits is stored in the first memory device; and the output signal generator generates, upon activation of the second data entry device, the output signal based on the second sequence of stored digits and the frequency data.

7. A system as recited in claim 6, further comprising:

means for detecting activation of the first and second data entry devices that places the system in a programming mode; and programming means for allowing the first and second sequences of stored digits to be changed when the system is in the programming mode.

8. A system as recited in claim 7, in which the first and second sequences of stored digits each comprise a plurality of numbers, the system further comprising a counter for counting the activations of the first and second data entry devices in pluralities of groups of activations, where the number of activations in each of the plurality of groups of activations are stored in the first memory device as one of the numbers of the sequences of stored digits.

9. A system as recited in claim 1, in which the second memory device stores a first and second of sets of frequency data, where each set of frequency data represents a sine wave signal having a predetermined frequency.

10. A system as recited in claim 9, further comprising summing means for adding the first and second sets of frequency data to obtain composite data, where the composite data represents a composite signal comprising first and second sine wave signals associated with the first and second sets of frequency data.

11. A system as recited in claim 10, further comprising a pulse-width modulator for converting the composite data into the output signal.

12. A system as recited in claim 11, in which the output signal generator generates the output signal based on a binary representation of the composite data.

13. A system as recited in claim 12, in which binary representation of the composite data generally corresponds to a value of the composite signal at a given point in time.

14. A system as recited in claim 13, in which the output signal generator generates the output signal as a HI or LOW signal based on the value of the bits forming binary numbers of the modulation data.

15. A system as recited in claim 1, in which:

the transducer comprises a capacitive element;

the output signal is a pulse-width modulated signal; and the capacitive element of the transducer forms part of a filtering circuit that filters the pulse-width modulated output signal such that the audible signal is a composite signal comprising first and second sine wave signals, where the frequencies of the first and second sine wave signals are associated with the numbers of the first sequence of stored digits.

16. A system as recited in claim 11, in which:

the transducer comprises a capacitive element;

the capacitive element of the transducer forms part of a filtering circuit that filters the pulse-width modulated output signal such that the audible signal represents the composite signal, where the frequencies of the first and second sine wave signals forming the composite signal are associated with the numbers of the first sequence of stored digits.

17. A system for generating number tones for dialing a telephone device comprising a microphone, comprising:

a housing defining a sound opening;

first and second data entry devices supported by the housing, where the first and second data entry devices are associated with the first and second sequences of stored digits;

a first memory device for storing the first and second sequences of stored digits;

a second memory device for storing a plurality of sets of frequency data, where each set of frequency data represents a sine wave signal having a predetermined frequency, and the predetermined frequencies of pairs of the sine wave signals are associated with number tones;

summing means for adding the first and second sets of frequency data to obtain composite data, where the composite data represents a composite signal comprising first and second sine wave signals associated with the first and second sets of frequency data;

an output signal generator comprising a pulse-width modulator for generating, upon activation of one of the first and second data entry devices, the output signal based on the composite data; and a transducer mounted within the housing adjacent to the sound opening, where the transducer vibrates to convert the output signal into an audible signal and comprises a capacitive element that forms a part of a filter circuit that filters the output signal; whereby the housing is adapted to be attached to the telephone device with the sound opening adjacent to the microphone.

18. A system as recited in claim 17, further comprising:

means for detecting activation of the first and second data entry devices that places the system in a programming mode; and programming means for allowing the first and second sequences of stored digits to be changed when the system is in the programming mode.

19. A system as recited in claim 17, in which the output signal generator generates the output signal based on a binary representation of the composite data.

20. A method of generating number tones for dialing a telephone device comprising a microphone, the method comprising the steps of:

providing a housing defining a sound opening;

associating a first data entry device with a first sequence of stored digits;

supporting the first data entry device on the housing;

storing the first sequence of stored digits;

storing frequency data associated with number tones where the second memory device stores first and second sets of frequency data, and each set of frequency data represents a sine wave signal having a predetermined frequency;

mounting a transducer within the housing adjacent to the sound opening;

attaching the housing to the telephone device with the sound opening adjacent to the microphone; and generating, upon activation of the first data entry device, an output signal based on the first sequence of stored digits and by pulse-width modulating a composite signal obtained by adding the first and second set of frequency data to obtain composite data, where the composite data represents a composite signal comprising first and second sine wave signals associated with the first and second sets of frequency data; and applying the output signal to the transducer such that the transducer converts the output signal into an audible signal.

21. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for storing frequency data associated with number tones;

an output signal generator for generating, upon activation of the first data entry device, an output signal based on the first sequence of stored digits and the frequency data; and a transducer mounted within the housing adjacent to the sound opening for converting the output signal into an audible signal;

means for detecting activation of the first data entry device that places the system in a programming mode; and programming means for allowing the first sequence of stored digits the changed when the system is in the programming mode; whereby the housing is adapted to be attached to the telephone device with the sound opening adjacent to the microphone; and the programming means comprises a counter for counting activation of the first data entry device in a first group of activations, where the number of activations in the first group of activations is stored in the first memory device as a first portion of the first sequence of stored digits.

22. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for storing frequency data associated with number tones;

an output signal generator for generating, upon activation of the first data entry device, an output signal based on the first sequence of stored digits and the frequency data; and a transducer mounted within the housing adjacent to the sound opening for converting the output signal into an audible signal; whereby the housing is adapted to be attached to the telephone device with the sound opening adjacent to the microphone; and the first sequence of stored digits comprises a plurality of numbers, the system further comprising a counter for counting activations of the first data entry device in a plurality of groups of activations, where the number of activations in each of the plurality of groups of activations are stored in the first memory device as one of the numbers of the first sequence of stored digits.

23. A system as recited in claim 22, further comprising:

a timer for measuring a delay period during which the first data entry device is not activated; and means for storing the number of activations in each of the plurality of groups of activations in the first memory device as one of the numbers of the first sequence of stored digits based on the delay period.

24. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for storing frequency data associated with number tones;

an output signal generator for generating, upon activation of the first data entry device, an output signal based on the first sequence of stored digits and the frequency data;

a transducer mounted within the housing adjacent to the sound opening for converting the output signal into an audible signal; and a second data entry device supported by the housing; whereby the housing is adapted to be attached to the telephone device with the sound opening adjacent to the microphone;

the second data entry device is associated with a second sequence of stored digits;

the second sequence of stored digits is stored in the first memory device; and the output signal generator generates, upon activation of the second data entry device, the output signal based on the second sequence of stored digits and the frequency data.

25. A system as recited in claim 24, further comprising:

means for detecting activation of the first and second data entry devices that places the system in a programming mode; and programming means for allowing the first and second sequences of stored digits to be changed when the system is in the programming mode.

26. A system as recited in claim 25, in which the first and second sequences of stored digits each comprise a plurality of numbers, the system further comprising a counter for counting the activations of the first and second data entry devices in pluralities of groups of activations, where the number of activations in each of the plurality of group of activations are stored in the first memory device as one of the numbers of the sequences of stored digits.

27. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for strong frequency data associated with number tones, where the second memory device stores first and second sets of frequency data, and each set of frequency data represents a sine wave signal having a predetermined frequency;

an output signal generator for generating, upon activation of the first data entry device, an output signal based on the first sequence of stored digits and the frequency data;

a transducer mounted within the housing adjacent to the sound opening for converting the output signal into an audible signal; and summing means for adding the first and second sets of frequency data to obtain composite data, where the composite data represents a composite signal comprising first and second sine wave signals associated with the first and second sets of frequency data; whereby the housing is adapted to be attached to the telephone device with the sound opening adjacent to the microphone.

28. A system as recited in claim 27, further comprising a pulse-width modulator for converting the composite data into the output signal.

29. A system as recited in claim 28, in which the output signal generator generates the output signal based on a binary representation of the composite data.

30. A system as recited in claim 29, in which binary representation of the composite data generally corresponds to a value of the composite signal at a given point in time.

31. A system as recited in claim 30, in which the output signal generator generates the output signal as a HI or LOW signal based on the value of the bits forming binary numbers of the modulation data.

32. A system as recited in claim 27, further comprising:

means for detecting activation of the first data entry device that places the system in a programming mode; and programming means for allowing the first sequence of stored digits to be changed when the system is in the programming mode.

33. A system as recited in claim 32, in which the programming means comprises a counter for counting activations of the first data entry device in a first group of activations, where the number of activations in the first group of activations is stored in the first memory device as a first portion of the first sequence of stored digits.

34. A system as recited in claim 32, in which the first sequence of stored digits comprises a plurality of numbers, the system further comprising a counter for counting activations of the first data entry device in a plurality of groups of activations where the number of activations in each of the plurality of groups of activations are stored in the first memory device as one of the numbers of the first sequence of stored digits.

35. A system as recited in claim 34, further comprising:

a timer for measuring a delay period during which the first data entry device is not activated; and means for storing the number of activations in each of the plurality of groups of activations in the first memory device as one of the numbers of the first sequence of stored digits based on the delay period.

36. A system as recited in claim 27, further comprising a second data entry device supported by the housing, wherein:

the second data entry device is associated with a second sequence of stored digits;

the second sequence of stored digits is stored in the first memory device; and the output signal generator generates, upon activation of the second data entry device, the output signal based on the second sequence of stored digits and the frequency data.

37. A system as recited in claim 36, further comprising:

means for detecting activation of the first and second data entry devise that places the system in a programming mode; and programming means for allowing the first and second sequences of stored digits to be changed when the system is in the programming mode.

38. A system as recited in claim 37, in which the first and second sequences of stored digits each comprise a plurality of numbers, the system further comprising a counter for counting the activations of the first and second data entry devices in pluralities of groups of activations, where the number of activations in each of the plurality of group of activations are stored in the first memory device as one of the numbers of the sequences of stored digits.

39. A system for generating number tones for dialing a telephone device comprising a microphone, comprising:

a housing defining a sound opening;

a first data entry device supported by the housing, where the first data entry device is associated with a first sequence of stored digits;

a first memory device for storing the first sequence of stored digits;

a second memory device for storing frequency data associated with number tones;

an output signal generator for generating, upon activation of the first data entry device, an output signal based on the first sequence of stored digits and the frequency data; and a transducer mounted within the housing adjacent to the sound opening for converting the output signal into an audible signal; whereby the housing is adapted to be attached to the telephone device with the sound opening adjacent to the microphone;

the transducer comprises a capacitive element;

the output signal is a pulse-width modulated signal; and the capacitive element of the transducer forms part of a filtering circuit that filters the pulse-width modulated output signal such that the audible signal is a composite signal comprising first and second sine wave signals, where the frequencies of the first and second sine wave signals are associated with the numbers of the first sequence of stored digits.

40. A system as recited in claim 27, in which:

the transducer comprises a capacitive element;

the capacitive element of the transducer forms part of a filtering circuit that filters the pulse-width modulated output signal such that the audible signal represents the composite signal, where the frequencies of the first and second sine wave signals forming the composite signal are associated with the numbers of the first sequence of stored digits.

* * * * *